No. 848,617. PATENTED APR. 2, 1907.
L. F. ADT.
SPRING FOR EYEGLASSES.
APPLICATION FILED OCT. 27, 1905.
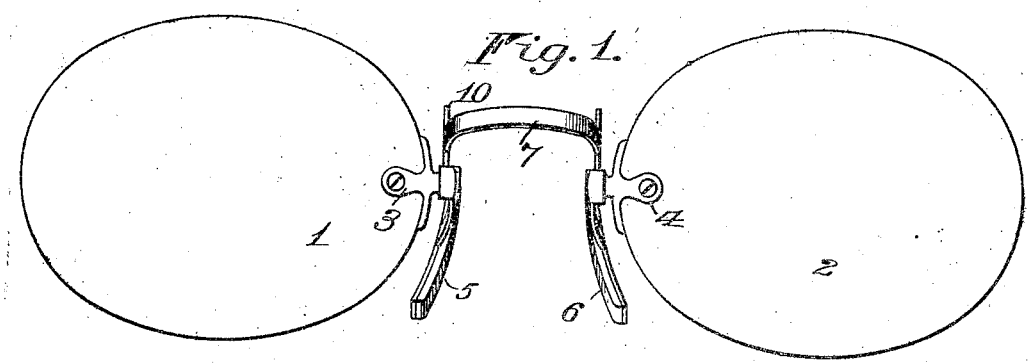
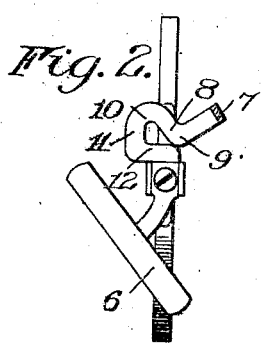
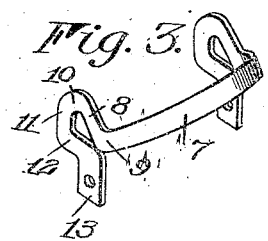
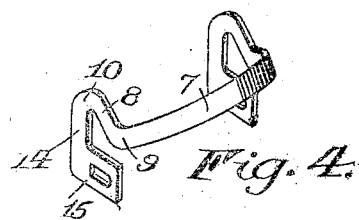
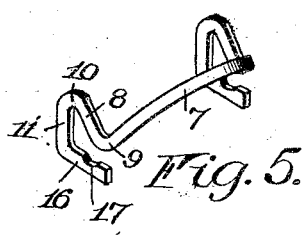
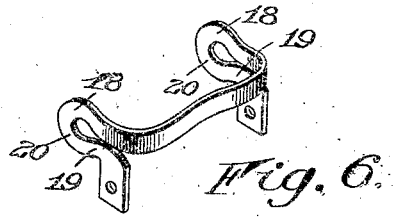
Witnesses
Inventor

UNITED STATES PATENT OFFICE.

LEO F. ADT, OF ALBANY, NEW YORK.

SPRING FOR EYEGLASSES.

No. 848,817.    Specification of Letters Patent.    Patented April 2, 1907.

Application filed October 27, 1905. Serial No. 284,632.

*To all whom it may concern:*

Be it known that I, LEO F. ADT, of Albany, in the county of Albany and State of New York, have invented certain new and useful Improvements in Springs for Eyeglasses; and I do hereby declare the following to be a full, clear, and exact description of the same, reference being had to the accompanying drawings, forming a part of this specification, and to the reference-numerals marked thereon.

My present invention relates to improvements in eyeglasses; and the object in view is to provide an improved spring having its ends bent to insure ample resiliency, while very little of the material of the spring is visible when the mounting is viewed from the front, the mounting being of the type wherein the nose-guards are proximated and separated by relative motion of the lenses. To these and other ends the invention consists in certain improvements that will be hereinafter more fully described, the novel features being pointed out in the annexed claims.

In the drawings, Figure 1 is a view in front elevation of a pair of eyeglasses having a bridge-spring constructed in accordance with my invention. Fig. 2 represents a transverse section through the spring. Fig. 3 is a perspective view of the spring detached from the lenses. Figs. 4, 5, and 6 are perspective views similar to Fig. 3, showing different ways of forming the springs embodying my invention.

The bridge-springs embodying my present invention are particularly adapted to be applied to the well-known type of eyeglasses comprising the lenses 1 and 2, having suitable attaching devices 3 and 4 for securing the nose-guards 5 and 6, the latter being operable with the lenses as the outer ends of the lenses are deflected forwardly or rearwardly, the guards engaging the sides of the wearer's nose to secure the eyeglasses. The bridge-spring 7, connecting the lenses, as shown in Figs. 1 and 2, has a central portion for spanning the nose, being arched, if desired, to fit closely to the nose, the ends of the central portion each extending in a direction generally outwardly, rearwardly, and downwardly to a point close above the corresponding attaching device and thence bending upwardly and rearwardly, as at 8, to form a forward vertical inverted loop or bend 9, the ends of the central portion of the bridge ending just above the corresponding attaching devices. The rearwardly and upwardly extending portion 8 extends to a point preferably in rear of the plane of the lenses and thence bends downwardly to form the reversely-arranged vertical loop 10, having a vertical arm 11 extending downwardly therefrom, the arms of both of the loops lying in a plane arranged transversely of the plane of the lenses. The lower end of the vertical arm 11 is provided with a forwardly-extending arm 12, having the downwardly-extending attaching-arm 13 attached to the attaching device from above, so that the loops 9 and 10 of the bridge are above the point of attachment.

Instead of forming the spring as shown in Figs. 1 and 2 the rear loop 10 of the spring shown in Fig. 4 has a downwardly-extending arm 14 adapted to extend behind the attaching device, a forwardly-projecting lug 15 thereon extending to the attaching device from the rear. However, while the bridge-spring shown in Fig. 4 is formed of flat material, this is not necessarily so, for the spring may be made from narrow stock and of different cross-sections, such a spring being shown in Fig. 5, this form being like that shown in Fig. 4, excepting that the narrow forwardly-extending attaching-arm 16 is provided with a notch or semicircular recess 17 therein for the securing-screw of the attaching device.

The spring shown in Fig. 6 is similar to that shown in Figs. 1 and 2, although the rear loop 18 thereof is located farther to the rear of the plane of the lenses, the forwardly-extending arm 19 having a bend 20 therein below the top of the attaching devices, with the result that both loops of the bridge rest at a lower level above the attaching device, the increased length of material in the loops affording greater resiliency to the spring as the lenses are operated in proximating and separating the nose-guards.

In the several forms of my invention the double reversely-arranged loops afford ample action to the spring to enable the eyeglasses to be applied and removed from the nose with convenience, and as the arms of the loops lie in planes arranged transversely to that of the lenses the increased length of the bridge will be practically invisible, and therefore the mounting will not be conspicuous when worn and viewed from the front, while the peculiar arrangement of the bends or loops brings the bridge low upon the wearer's nose, the ends of the arch of the bridge resting close to the attaching devices, and while it is generally preferable to form the springs of flat material to insure horizontal operation of the lenses in separating and proximating the guards stock of other cross-sections may be employed, if desired.

It will be noted that in the constructions shown particularly in Figs. 1 to 4 of the drawings the stock of which the spring is composed is bent edgewise twice above the attaching ends, once between the portion 7, which spans the bridge of the wearer's nose, to form the bend 9, and again to form the bend 10, both these being above the point of attachment to the lenses, thus giving material for horizontal adjustment or flexing above the studs and without liability of interfering with the guards or studs. This flexibility enables the guards to be separated either by a vertical or horizontal movement of the lenses, but preferably by a movement somewhere between the two, with no liability of unduly straining the stock.

I claim as my invention—

1. In eyeglasses, the combination with the lenses, and nose-guards therefor, of a bridge-spring having attaching ends and reversely-arranged bends therein disposed between the attached ends and the middle of the spring and in planes transverse to the plane of the lenses and arranged above the attaching ends.

2. In eyeglasses, the combination with the lenses, nose-guards therefor and attaching devices, of a spring connected to the attaching devices at its ends and having vertical bends formed therein and extending transversely of the plane of the lenses, all portions of the spring being arranged above the attaching ends and the apexes of the bends being located adjacent to the attaching devices.

3. In eyeglasses, the combination with the lenses, and nose-guards therefor, of a spring connecting the lenses having depressed bends or loops therein to bring the ends of the central nose-spanning portion and all parts of the spring close to and wholly above the points of attachment of the spring.

4. In eyeglasses, the combination with the lenses and nose-guards therefor, of a spring connecting the lenses having open loops therein with their arms arranged in a substantially vertical plane, disposed transversely of the plane of the lenses, all portions of the spring being arranged above the point of attachment to the lenses.

5. In eyeglasses, the combination with the lenses, nose-guards therefor, and attaching devices movable with the lenses, of a spring connecting the attaching devices having vertical, reversely-arranged bends therein above the plane of the attaching devices and between the central and attached portions of the spring.

6. In eyeglasses, the combination with the lenses and nose-guards therefor, of a spring connecting the lenses embodying a central portion having its ends extending downward and upward to form a vertical bend close to the point of attachment of the spring, the upwardly-extending portions being bent downwardly to form a second bend in rear of the first, said bends being formed between the points of attachment and the central portion of the spring.

7. In eyeglasses, the combination with the lenses, guards therefor, and attaching devices carried by the lenses, of a spring connecting the lenses having a central portion, the ends of the spring extending downwardly to a point adjacent to the corresponding attaching devices, thence upwardly, rearwardly, forwardly and downwardly to the attaching devices.

8. In eyeglasses, the combination with the lenses, guards and attaching devices carried by the lenses, of a spring composed of flat material connecting the lenses having the central arched portion and the ends, connected to the attaching devices on the lenses, the material of the spring between said central portion and the ends having two bends edgewise of the material and located above the attaching devices in the lenses.

9. In eyeglasses, the combination with the lenses, guards and attaching devices carried by the lenses, of a spring composed of flat material connecting the lenses having the central portion and its attaching ends connected to the attaching devices on the lenses, the material of the spring between said central portion and the ends having two bends edgewise of the material opening in opposite directions and located above the attaching devices.

10. In eyeglasses, the combination with the lenses, guards and attaching devices carried by the lenses, of a spring connecting the lenses having the central portion and the ends connected to the attaching devices on the lenses, the material of the spring between said central portion and ends having two bends extending transversely of the plane of the lenses opening in opposite directions and located above the attaching devices on the lenses.

LEO F. ADT.

Witnesses:
MICHAEL F. O'CONNOR,
CHARLES S. ALDRICH.